(12) United States Patent
Alfarhan

(10) Patent No.: US 11,953,318 B1
(45) Date of Patent: Apr. 9, 2024

(54) ENDODONTIC FILE MEASURING DEVICE

(71) Applicant: KING SAUD UNIVERSITY, Riyadh (SA)

(72) Inventor: Ghalya Alfarhan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/113,788

(22) Filed: Feb. 24, 2023

(51) Int. Cl.
*A61C 19/04* (2006.01)
*G01B 21/02* (2006.01)

(52) U.S. Cl.
CPC .............. *G01B 21/02* (2013.01); *A61C 19/04* (2013.01)

(58) Field of Classification Search
CPC ....... G01B 21/02; A61C 19/04; A61C 19/041; A61C 19/042; A61C 19/043; A61C 5/44
USPC .......................................... 433/102, 224, 72
See application file for complete search history.

(56) References Cited

U.S. PATENT DOCUMENTS

| | | | |
|---|---|---|---|
| 3,295,208 A * | 1/1967 | Redtenbacher | A61C 5/44 433/77 |
| 3,358,826 A | 12/1967 | Siegel | |
| 3,855,705 A | 12/1974 | Malmin | |
| 4,028,810 A | 6/1977 | Vice | |
| 4,165,562 A | 8/1979 | Sarfatti | |
| 4,182,040 A | 1/1980 | Bechtold, Jr. | |
| 4,212,639 A | 7/1980 | Schaffner | |
| 6,128,966 A * | 10/2000 | Usui | A61C 19/04 433/114 |
| 6,358,049 B1 | 3/2002 | Cerniway | |
| 6,464,497 B2 * | 10/2002 | Landoz | A61C 3/04 433/77 |
| 7,232,309 B2 | 6/2007 | Tse | |
| 10,864,060 B1 * | 12/2020 | Basudan | A61C 19/04 |
| 2001/0038995 A1 * | 11/2001 | Landoz | A61C 5/44 433/102 |
| 2002/0064757 A1 * | 5/2002 | Cerniway | A61C 5/44 433/102 |
| 2003/0091956 A1 * | 5/2003 | Chadwick | A61C 5/44 433/102 |
| 2007/0254264 A1 * | 11/2007 | Nguyen | A61C 5/44 433/163 |
| 2012/0028212 A1 * | 2/2012 | Fujii | A61C 5/44 433/72 |
| 2012/0074011 A1 * | 3/2012 | Fujii | A61C 19/02 206/369 |

(Continued)

FOREIGN PATENT DOCUMENTS

CN 203053419 U 7/2013
KR 20190051420 A 5/2019

*Primary Examiner* — Nicholas D Lucchesi
(74) *Attorney, Agent, or Firm* — Nath, Goldberg & Meyer; Richard C. Litman

(57) ABSTRACT

An endodontic file measuring device includes a housing with an upper opening for receiving the file within a file channel in the housing. A movable base is disposed in the file channel and a plurality of sensors are disposed along the file channel. When a tip of the endodontic file is positioned on the movable base, the sensors can detect a presence of the file within the channel and measure a length of the file in the channel. A slider protrudes from the front wall of the housing and is connected to the base by a connecting rod. The slider can be manipulated by the user to lower or elevate the file within the base. A display on an outer surface of the housing displays the length of the file present in the file channel.

10 Claims, 8 Drawing Sheets

(56) References Cited

U.S. PATENT DOCUMENTS

| | | | |
|---|---|---|---|
| 2015/0257852 A1* | 9/2015 | Aravena | A61C 5/44 29/428 |
| 2017/0319290 A1* | 11/2017 | Aravena | A61C 5/44 |
| 2021/0172723 A1* | 6/2021 | Lee | G01B 11/022 |
| 2021/0251722 A1* | 8/2021 | Elayouti | A61C 5/44 |
| 2022/0307816 A1* | 9/2022 | Lee | G01B 5/0004 |

* cited by examiner

ENDODONTIC FILE MEASURING DEVICE

BACKGROUND

1. Field

The disclosure of the present patent application relates to measuring endodontic files, and particularly, to an electronic device for measuring endodontic files.

2. Description of the Related Art

Endodontic files are typically used in endodontic procedures for cleaning and shaping the root canal. Conventional endodontic treatment is done using endodontic files that are made of either stainless steel or nickel titanium. In a typical endodontic procedure, an apex locator device is used to provide an estimate of the canal length and an endodontic file is selected based on the estimated length. Typically, a file, e.g., a size 10 file with an attached rubber stopper is inserted into the canal. This initial file is usually the smallest binding file, which aids in locating the end of the canal with the help of an apex locator. This step is an important step of the procedure, as inserting an excessive length of the endodontic file into the canal can extrude or irritate biological tissue and inserting an insufficient length of the endodontic file in the canal can be inadequate for cleaning the canal. Hence, the canal length determines where cleaning and filling will stop, and the rubber stopper is adjusted accordingly. Furthermore, an endodontic ruler is used to measure the length obtained by the endodontic file. Typically, multiple measurements and a number of files of varying sizes are used during the treatment.

The endodontic file is typically configured to withstand only a certain amount of stress in the tooth before being replaced with another file during a root canal procedure. A file can be replaced either with a file of the same size, a larger size, or a smaller size based on the previous one being stressed or the technique being used. Accordingly, many different endodontic files are used during the procedure. Each file is typically measured with an endodontic ruler before being used so the clinician can be sure that a file does not extend beyond the required length.

Measuring the endodontic file with an endodontic ruler, however, can be subjective and is susceptible to error and inefficiency. Thus, an endodontic file measuring device solving the aforementioned problems is desired.

SUMMARY

An endodontic file measuring device includes a housing with an upper opening through which the endodontic file can be inserted into a file channel of the housing. A movable base is disposed in the file channel and a plurality of sensors are disposed along the file channel. When the endodontic file is positioned in the file channel, the sensors can detect a presence of the file within the channel and measure a length of the file in the file channel. A slider protrudes from the front wall of the housing and is connected to the base by a connecting rod. The slider can be manipulated by the user to lower or elevate the file that is positioned on the base. A display on an outer surface of the housing displays the length of the file present in the file channel.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
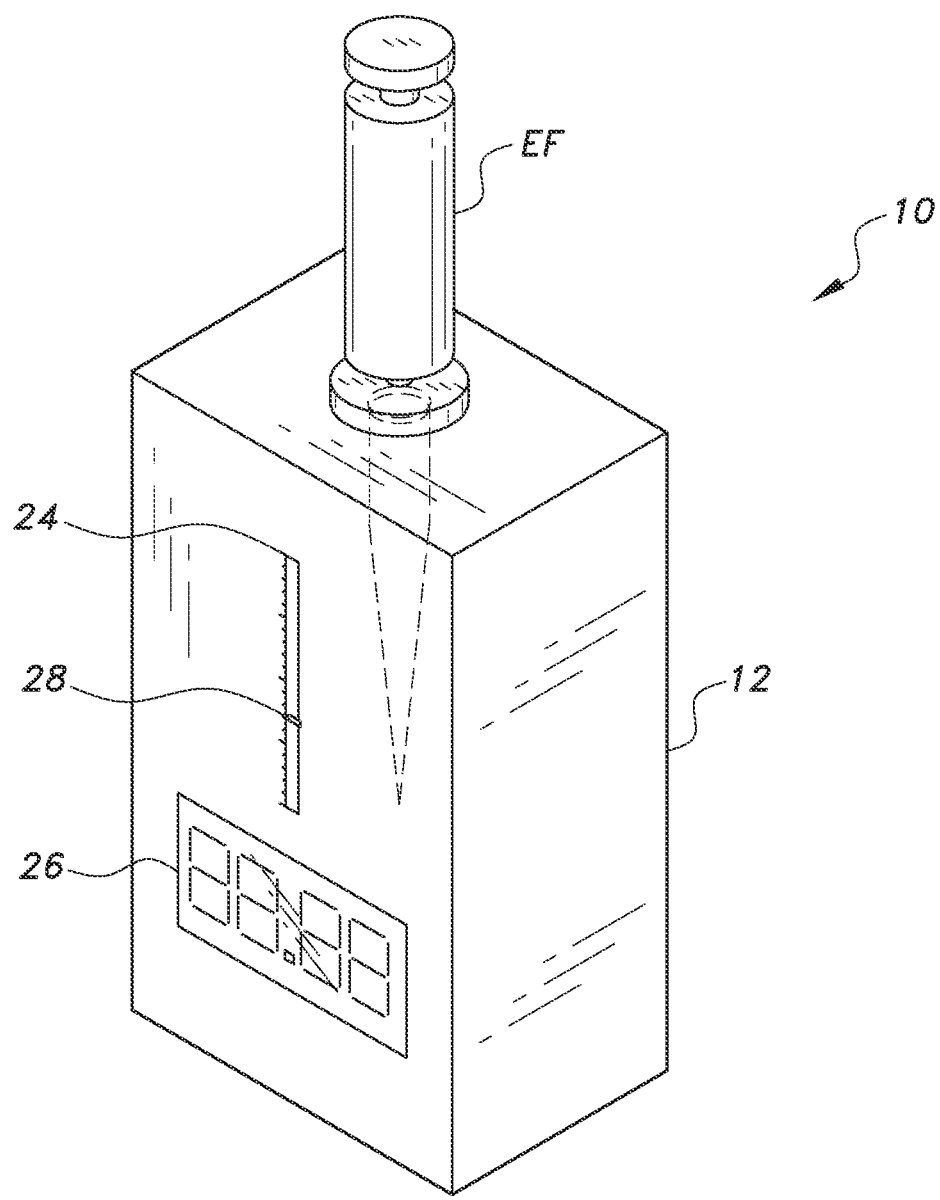
FIG. 1 is a perspective view of the endodontic file measuring device according to the present teachings.
Figure 2:
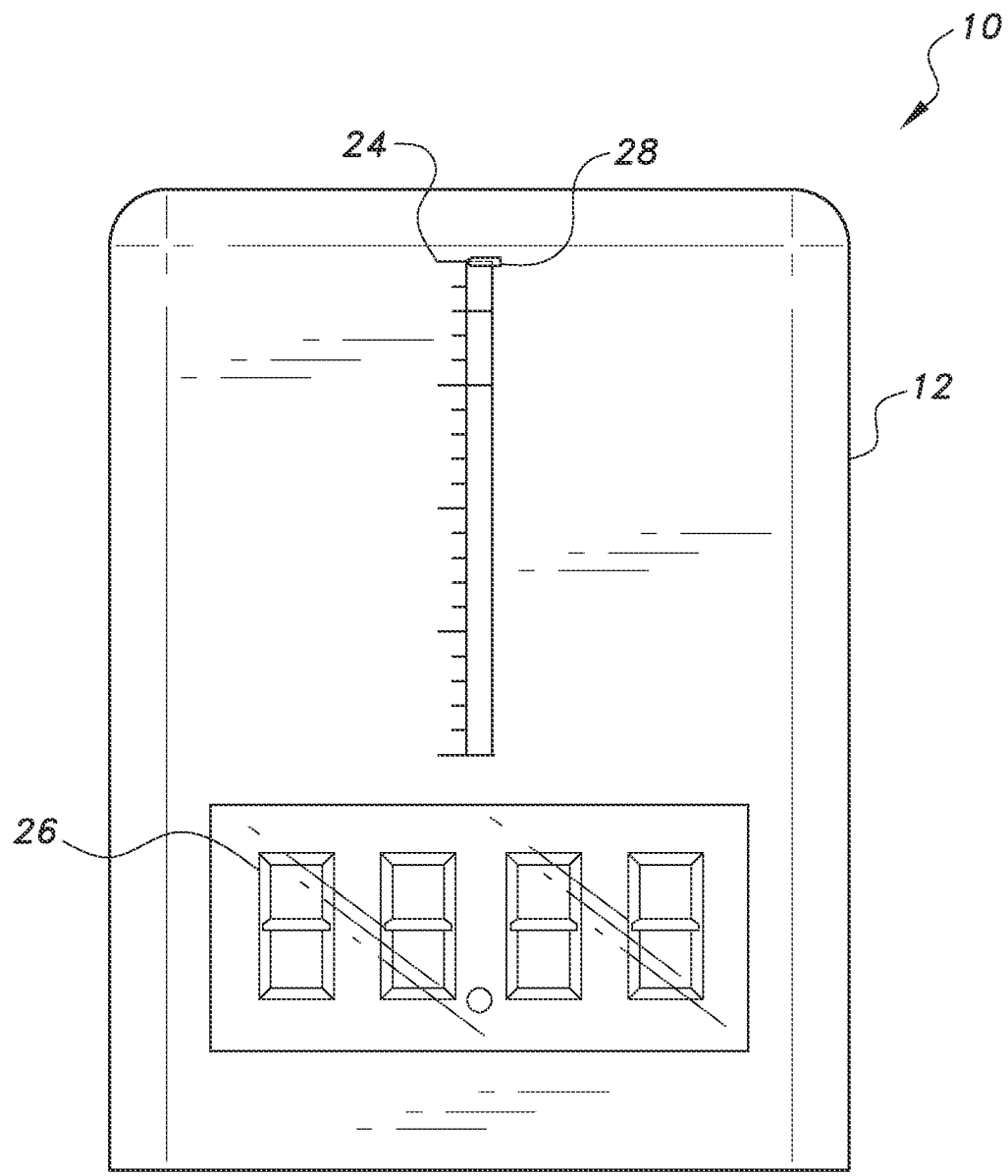
FIG. 2 is a front view of the endodontic file measuring device according to the present teachings.
Figure 3:
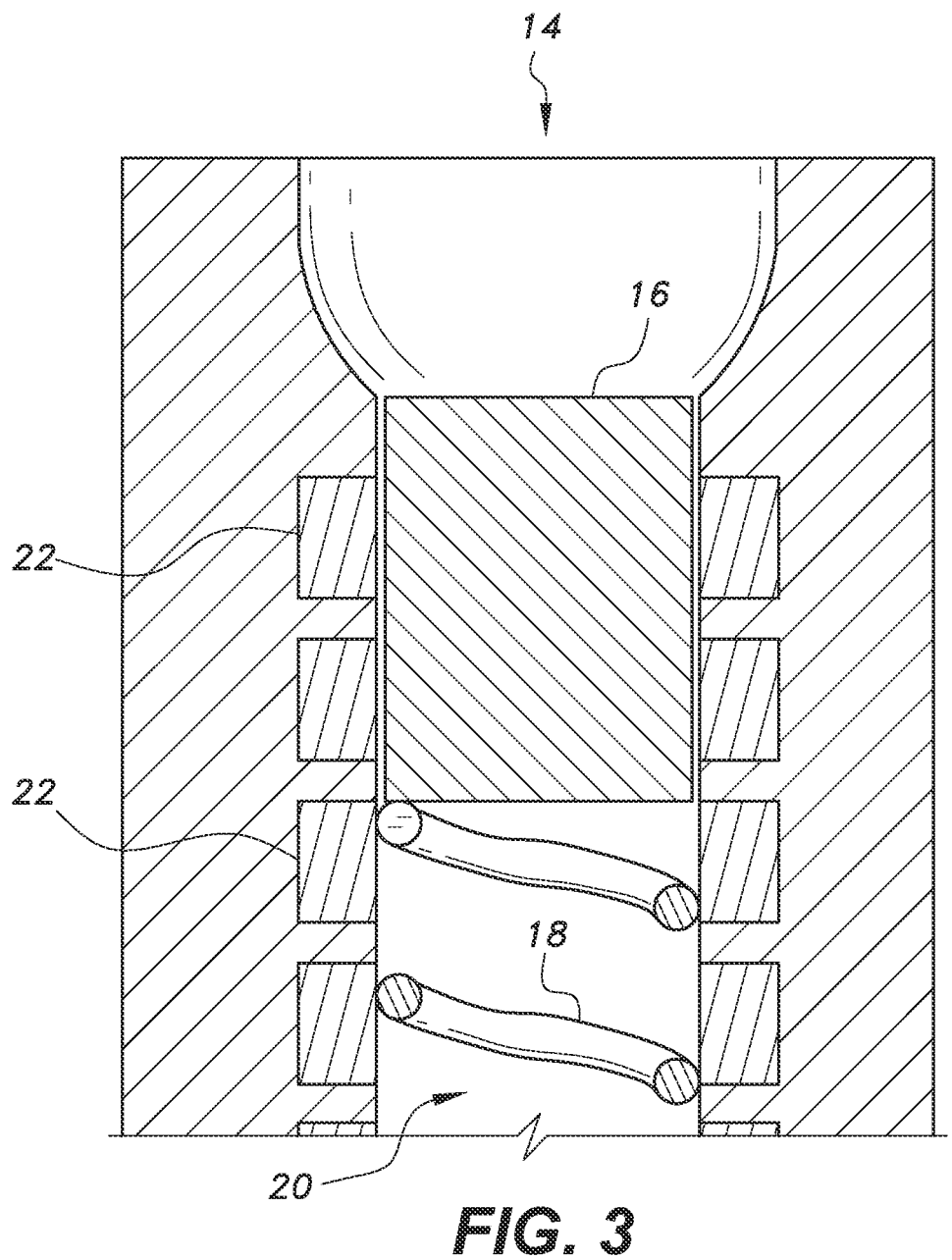
FIG. 3 is a fragmented, cross-sectional, front view of the endodontic file measuring device according to the present teachings.

Referring to FIGS. 1-3, the endodontic file measuring device 10 includes a generally rectangular housing 12 with an upper opening 14. A conventional endodontic file EF can be inserted into the upper opening 14 and positioned on a movable base 16 within a file channel 20 in the housing 12. Once positioned in the file channel 20, a precise measurement of the endodontic file EF can be provided on a screen or electronic visual display 26 outside of the housing 12.

Figure 7:
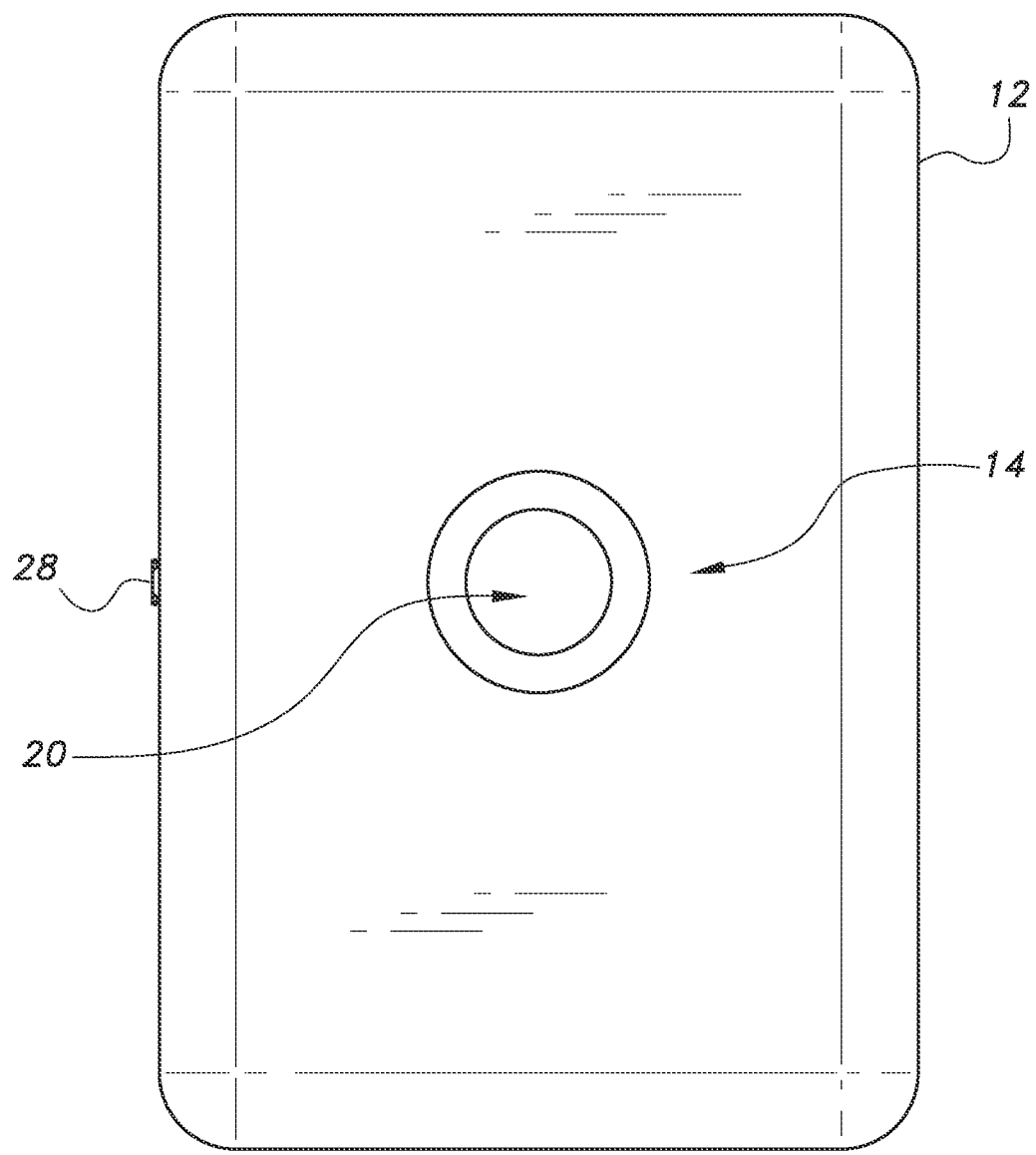
FIG. 7 is a top view of the endodontic file measuring device according to the present teachings.
Figure 8:
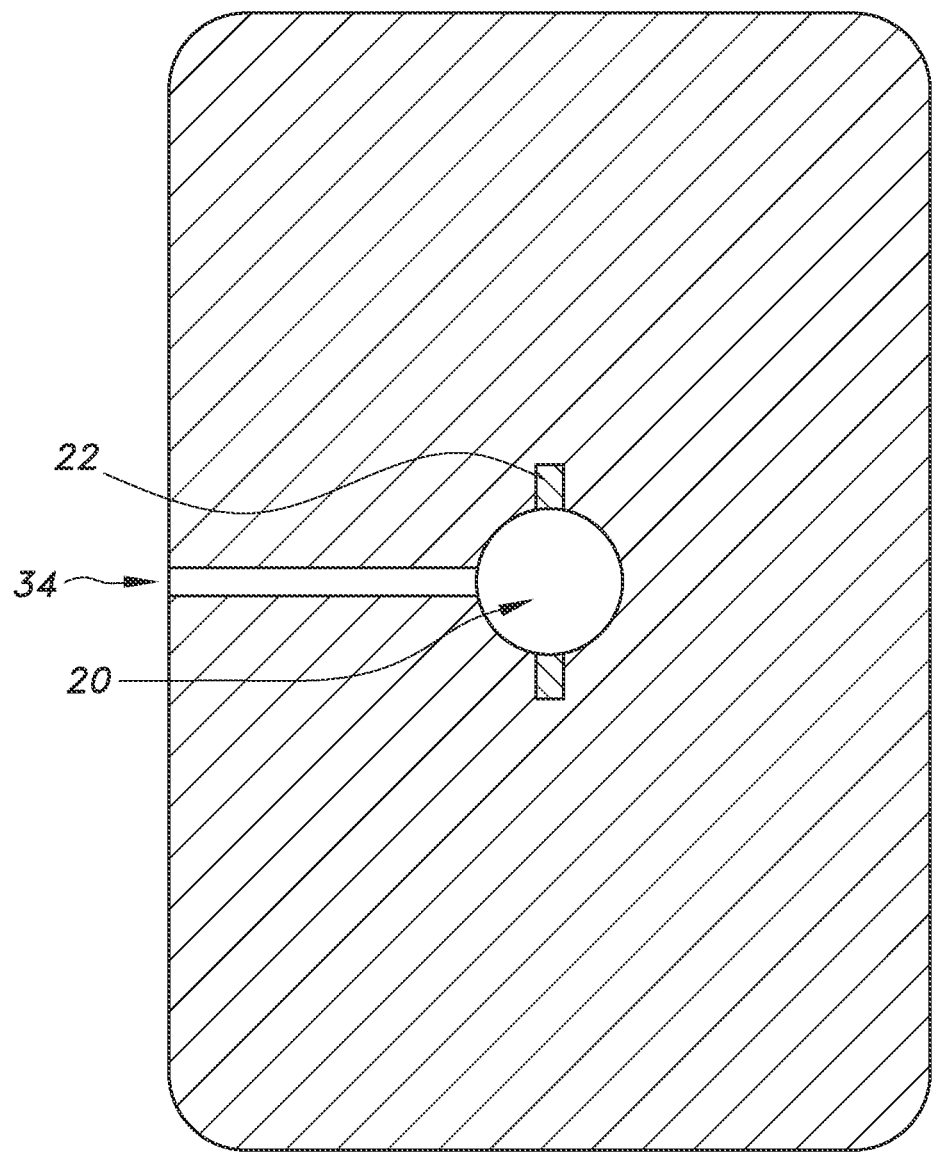
FIG. 8 is a cross-sectional, top view of the endodontic file measuring device according to the present teachings.

The housing 12 can be a generally rectangular block with a flat top surface. In an embodiment, the housing 12 can include parallel and opposing top and bottom end walls, parallel and opposing front and rear side walls extending between the end walls, and parallel and opposing right and left side walls extending between the end walls and adjacent to the front and rear side walls. In an embodiment, the upper opening 14 of the housing can be defined in a central portion of the top wall. The file channel 20 can be aligned with the upper opening 14 and extend at least partially through a central portion of the housing, as shown in FIG. 7.

Figure 4:
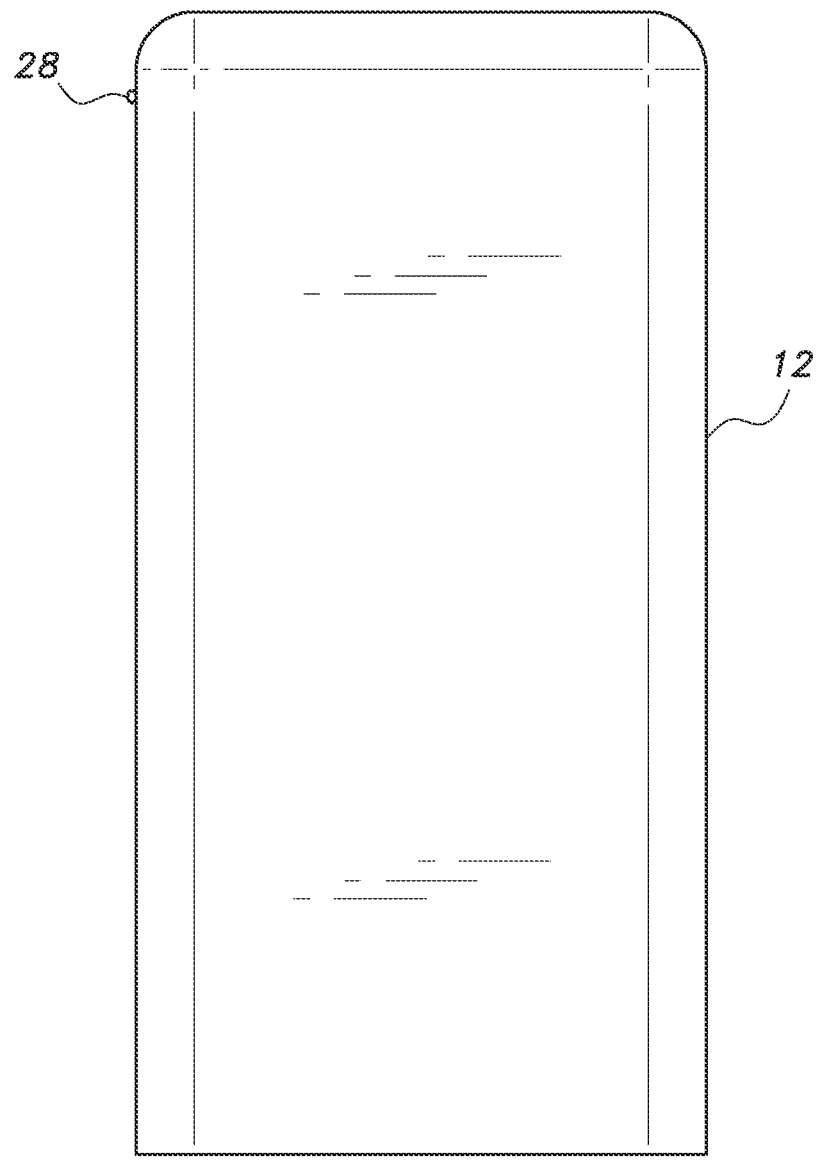
FIG. 4 is a side view of the endodontic file measuring device according to the present teachings.
Figure 5:
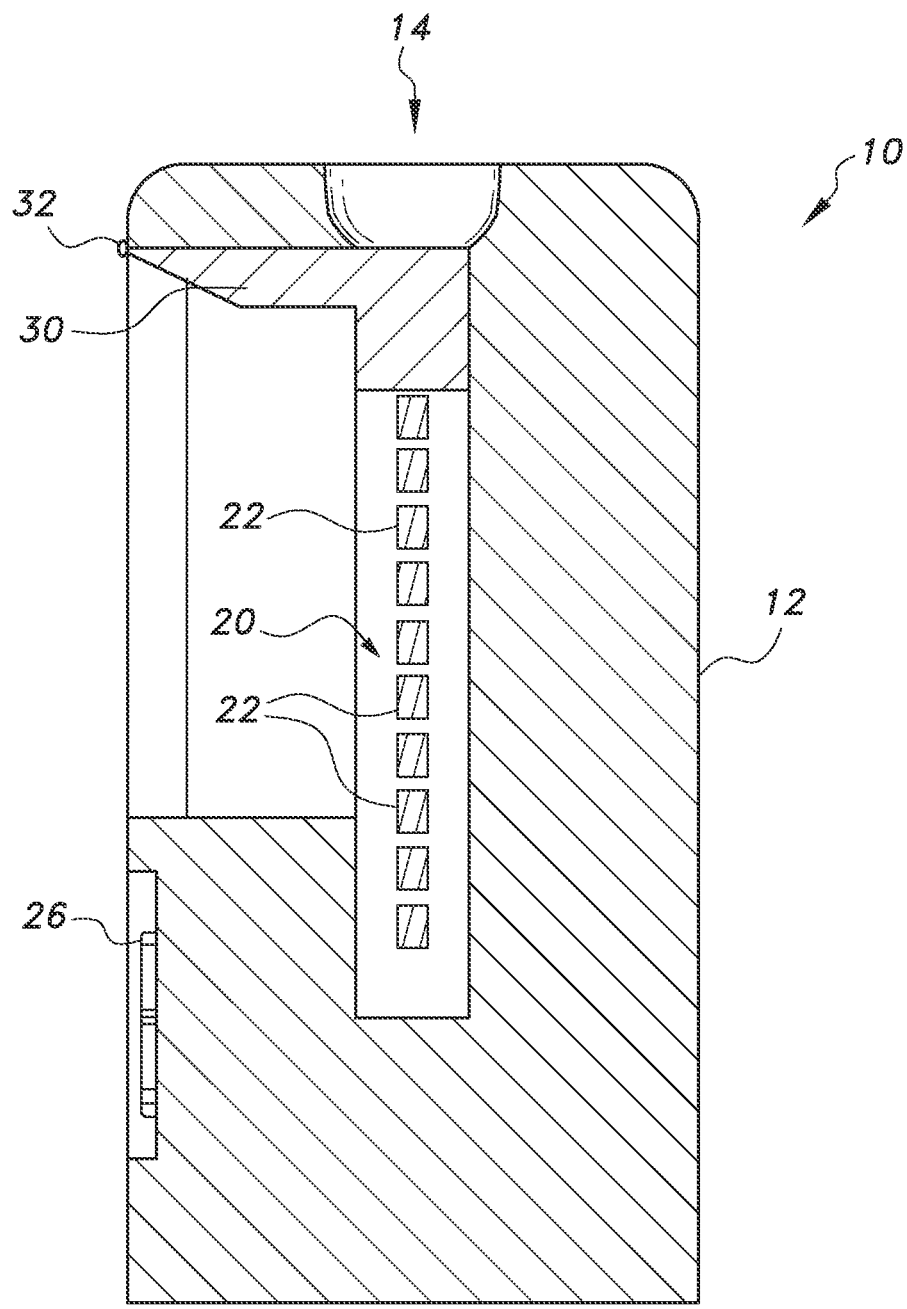
FIG. 5 is a cross-sectional, side view of the endodontic file measuring device according to the present teachings.
Figure 6:
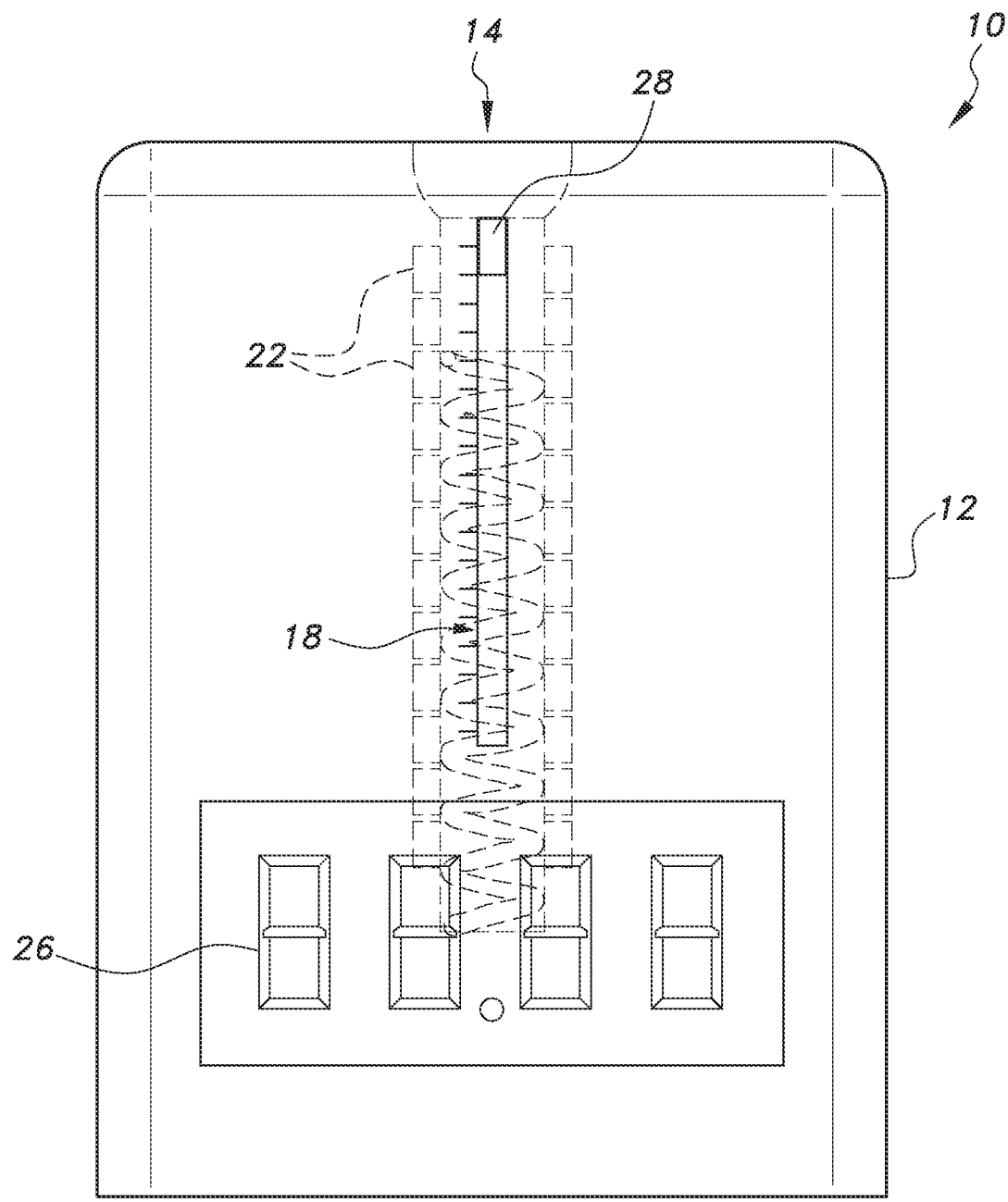
FIG. 6 is a front view of the endodontic file measuring device according to the present teachings, showing the spring and sensors in phantom lines.

As shown in FIGS. 3-5, the base 16 can be spring-loaded. For example, the base 16 can be supported in the housing 12 by a compressible spring 18. A slider 28 is connected to the base 16 by connecting rod 30. The slider 28 protrudes from a side wall of the housing 12, e.g., the front side wall. The connecting rod 30 is slidably received with a guiding channel 34. The guiding channel 34 can extend from the file channel 20 to a side wall of the housing from which the slider 28 protrudes. The slider 28 can be moved by the user to position the desired length of the file in the file channel 20. Movement of the slider 28 causes the connecting rod 30 to move within the guiding channel 34. The slider 28 can be depressed to lower the base 16 and elevated to raise the base 16 from a lowered position. Measuring indicia, preferably in millimeter increments, can be provided on an outer surface of the front wall to guide the user in moving the slider 28 in the amount needed to achieve the desired length, which will be indicated on the display 26.

A plurality of sensors 22 can be positioned along the file channel 20. The sensors 22 can be configured to detect a presence of the file EF within the channel 20 and measure a length of the file EF in the channel 20. In an embodiment, the sensors 22 are analog sensors. The sensors 22 are in electrical communication with the screen 26 which is configured to receive transmissions from the sensors and display the calculated length of the endodontic file EF present in the channel 20.

In use, an apex locator device can be used to determine a suitable length of a file to be inserted into the canal. The stopper can be used to mark the length of the file. This length can then be measured by the measuring device 10. Based on this measurement, a user can use the measuring device 10 to determine an appropriate or desired length of other endodontic files to be used during the procedure. For example, the user can insert a second endodontic file EF into the file channel 20 of the endodontic file measuring device 10 through the upper opening 14 such that the tip of the endodontic file EF is positioned on the base 16. The slider 28 can be raised or lowered within the file channel 20 until the desired length of the endodontic file EF is displayed on the screen. The rubber stopper on the second endodontic file EF can then be lowered to mark the position of the endodontic file EF corresponding to the desired length.

It is to be understood that the endodontic file measuring device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An endodontic file measuring device, comprising:
    a housing having parallel and opposing top and bottom end walls, parallel and opposing front and rear side walls extending between the end walls, and parallel and opposing right and left side walls extending between the end walls and adjacent to the front and rear side walls;
    an upper opening defined within the top end wall;
    a file channel aligned with the upper opening and extending into the housing;
    a movable base disposed within the file channel;
    a plurality of sensors positioned along the file channel;
    a slider protruding from one of the side walls of the housing, the slider being connected to the base by a connecting rod;
    a guiding channel defined within the housing for slidably receiving the connecting rod; and
    an electronic visual display in communication with the plurality of sensors.

2. The endodontic file measuring device as recited in claim 1, wherein the plurality of sensors are analog sensors.

3. The endodontic file measuring device as recited in claim 1, wherein the base is spring loaded.

4. The endodontic file measuring device as recited in claim 1, wherein the slider protrudes from the front side wall of the housing.

5. The endodontic file measuring device as recited in claim 1, wherein the upper opening of the housing is defined in a central portion of the top end wall.

6. An endodontic file measuring device, comprising:
    a housing having parallel and opposing top and bottom end walls, parallel and opposing front and rear side walls extending between the end walls, and parallel and opposing right and left side walls extending between the end walls and adjacent to the front and rear side walls;
    an upper opening defined within the top end wall;
    a file channel aligned with the upper opening and extending into the housing;
    a spring-loaded base disposed within the file channel;
    a plurality of sensors positioned along the file channel;
    a slider protruding from one of the side walls of the housing, the slider being connected to the base by a connecting rod;
    a guiding channel defined within the housing for slidably receiving the connecting rod; and
    an electronic visual display in communication with the plurality of sensors.

7. The endodontic file measuring device as recited in claim 6, wherein the plurality of sensors are analog sensors.

8. The endodontic file measuring device as recited in claim 6, wherein the slider protrudes from the front side wall of the housing.

9. The endodontic file measuring device as recited in claim 6, wherein the upper opening of the housing is defined in a central portion of the top end wall.

10. An endodontic file measuring device, comprising:
    a housing having parallel and opposing top and bottom end walls, parallel and opposing front and rear side walls extending between the end walls, and parallel and opposing right and left side walls extending between the end walls and adjacent to the front and rear side walls;
    an upper opening defined within the top end wall;
    a file channel aligned with the upper opening and extending into the housing;
    a spring-loaded base disposed within the file channel;
    a plurality of analog sensors positioned along the file channel;
    a slider protruding from one of the side walls of the housing, the slider being connected to the base by a connecting rod;
    a guiding channel defined within the housing for slidably receiving the connecting rod; and
    an electronic visual display in communication with the plurality of sensors.

* * * * *